Jan. 5, 1943.  F. W. OFELDT  2,307,330
PRESSURE CONTROL APPARATUS
Filed Feb. 24, 1939  3 Sheets-Sheet 1
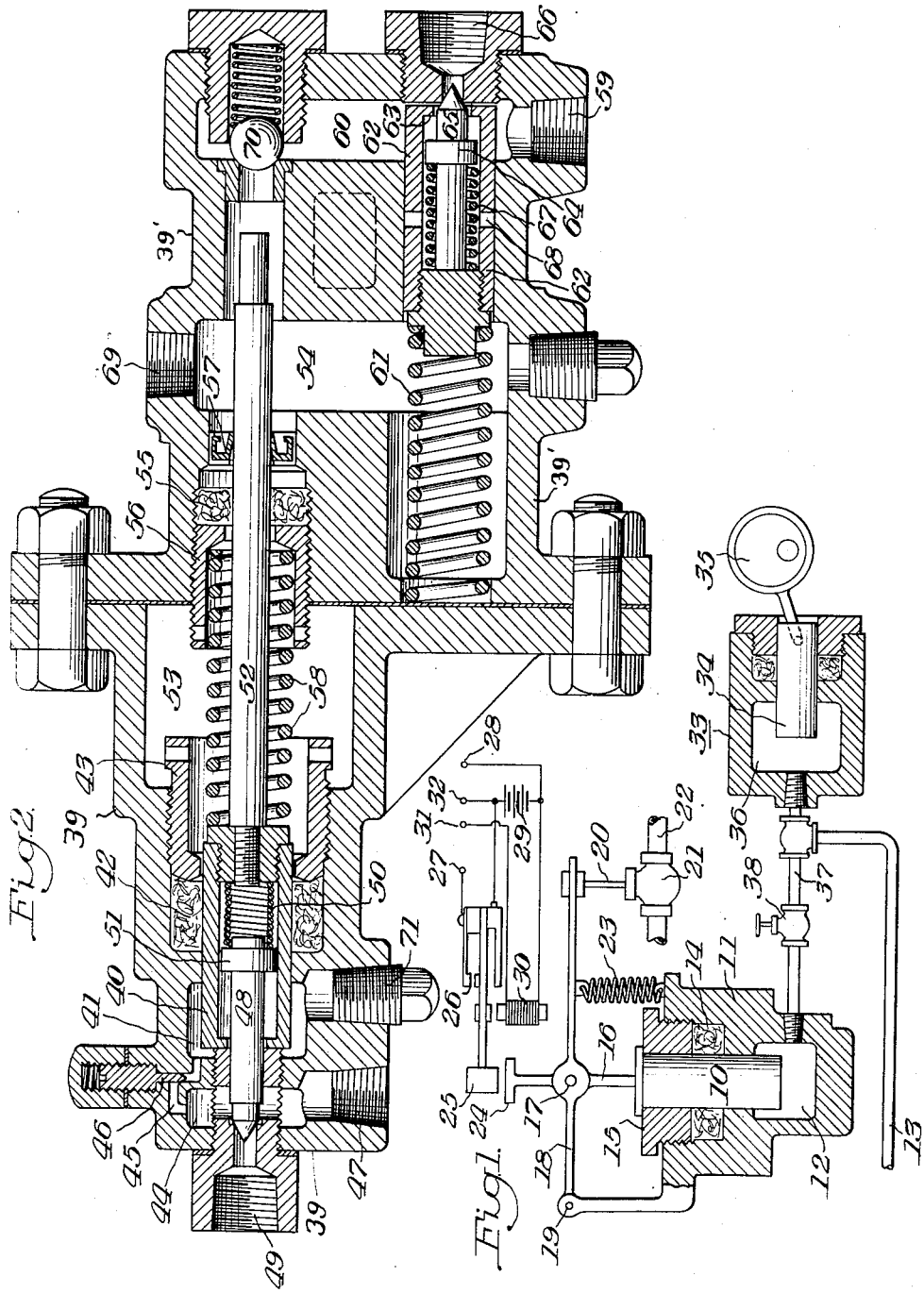
INVENTOR.
Frank W. Ofeldt
BY
his ATTORNEY.

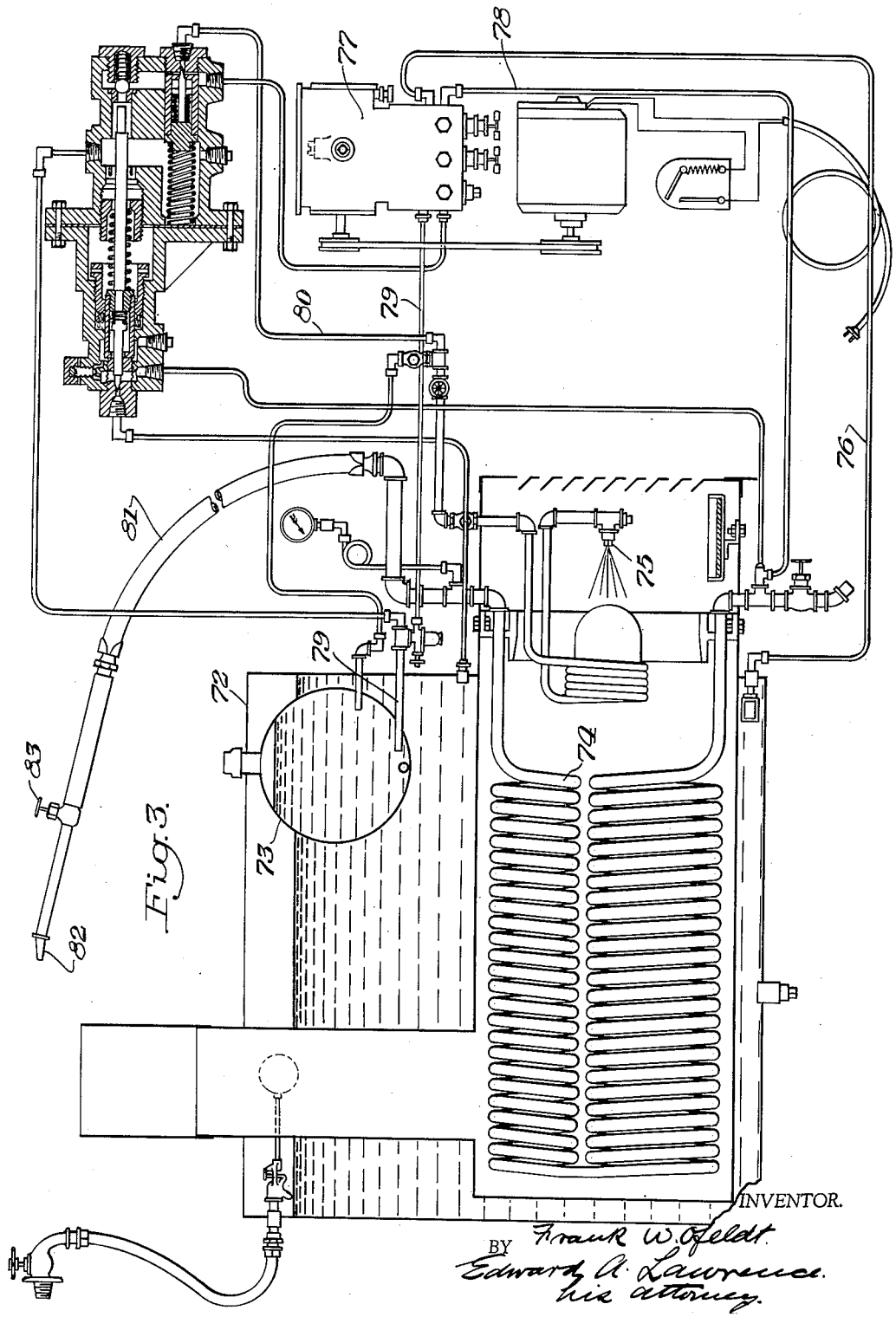

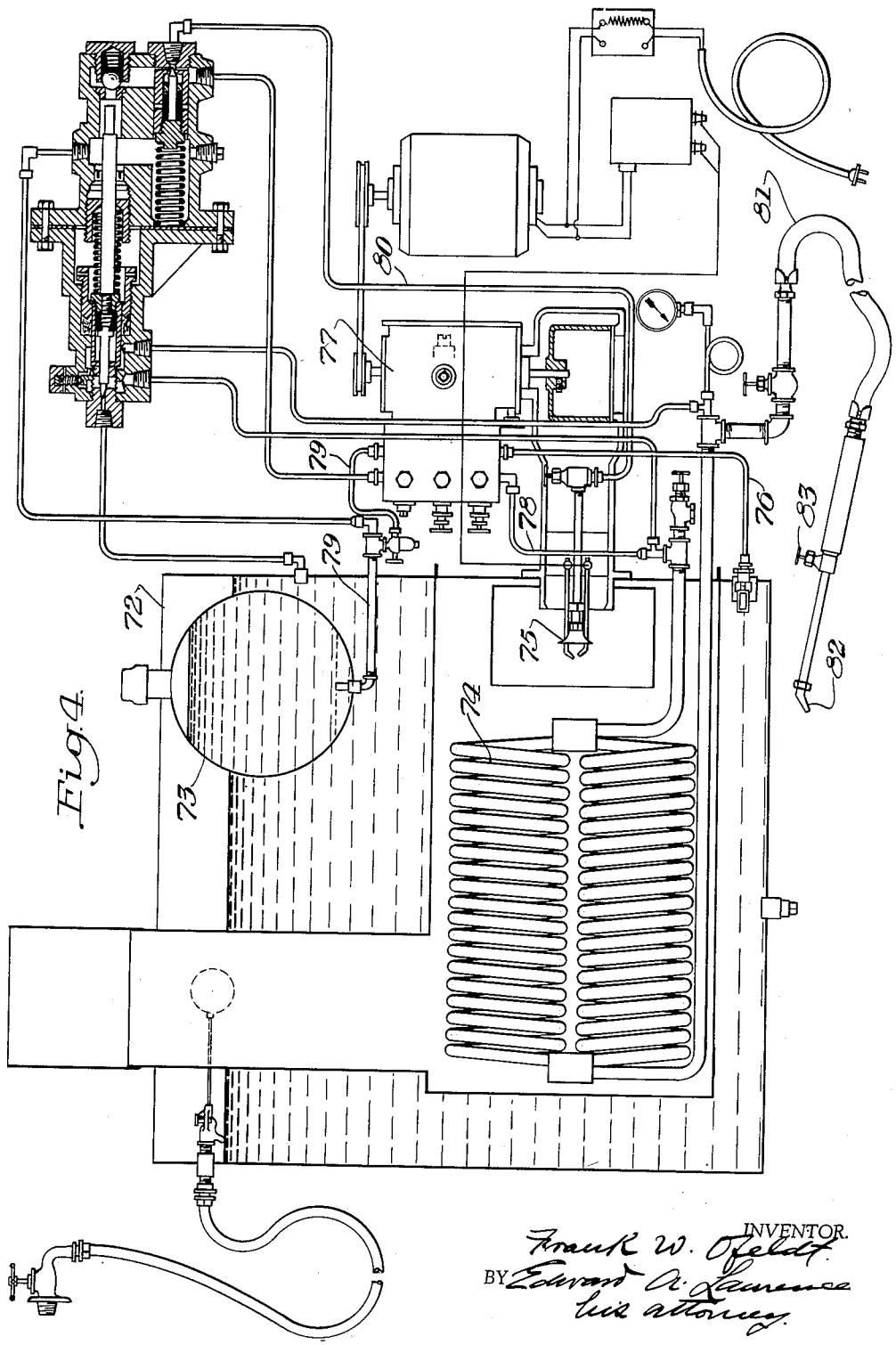

Patented Jan. 5, 1943

2,307,330

UNITED STATES PATENT OFFICE 2,307,330

PRESSURE CONTROL APPARATUS

Frank W. Ofeldt, McKeesport, Pa., assignor to Homestead Valve Manufacturing Company, Coraopolis, Pa., a corporation of Pennsylvania Application February 24, 1939, Serial No. 258,200

11 Claims. (Cl. 137—153)

This invention relates to fluid pressure control apparatus and more particularly to a control actuated by fluid under pressure for regulating the apparatus producing the fluid pressure or associated apparatus to be operated in conjunction therewith.

This invention may be advantageously applied to spray generating apparatus such as disclosed in the co-pending application Serial No. 258,199, filed February 24, 1939.

Diaphragms and metal bellows are commonly employed in pressure control apparatus of this character. However operation of this type of apparatus depends upon the vibration and the flexing of the metal making up these devices and their operating characteristics are naturally limited by the physical properties of the metal from which they are made. In order that such pressure control devices may be made sensitive they are made of thin material and are therefore limited as to the pressure to which they may be subjected. These controls may function properly under the normal pressures for which they are designed but they frequently rupture on overloads, which is partly due to fatigue of the metal. Again their pressure ranges are naturally sacrificed to gain sensitive operation.

The principal object of this invention is the provision of a rugged pressure control device that does not rely on the flexing of metal and will not break when subjected to pressures representing a low percentage of the normal pressure controlled and is capable of withstanding overloads equal to those of the pressure generating system.

Another object is the provision of a sensitive yet rugged control apparatus capable of operating within a very small differential throughout a relatively broad pressure range.

Another object is the provision of a rugged yet sensitive pressure control apparatus capable of performing a series of functions in sequence in response to an increasing fluid pressure.

Other objects and advantages are apparent in the following description and claims.

The accompanying drawings illustrate a practical embodiment of the principles of this invention wherein:

Fig. 1 is a diagrammatic view illustrating a fluid pressure control apparatus arranged to perform a mechanical and an electrical function.

Fig. 2 is a sectional view of a fluid pressure control apparatus arranged to perform a mechanical function which in actual practice is applied to spray generation.

Fig. 3 is a diagrammatic view showing the application of the fluid pressure control device comprising this invention employed with a vaporizing type of burner in a spray generating apparatus.

Fig. 4 is a diagrammatic view showing the application of the fluid pressure control device comprising this invention employed with an atomizing type of burner in a spray generating apparatus.

The control comprising this invention is obtained through the operation of the plunger 10 as shown in Fig. 1. This plunger is reciprocably mounted in the casting 11 with its inner end exposed to the fluid pressure chamber 12. The chamber 12 is connected by the pipe line 13 to the source of fluid pressure which is being controlled or represents the initial source for controlling an associated apparatus. The plunger 10 is sealed by the hydraulic packing 14 and the gland member 15 to prevent the escape of fluid under pressure.

The outer end of the plunger may be connected in any suitable manner to an operating arm which in turn actuates the control apparatus in response to the movement of the plunger which is reciprocated by pressure fluctuations. As shown the outer end of the plunger 10 is provided with the extension 16 which is pivotally connected at 17 to the operating arm 18. One end of the arm is pivoted at 19 to the casting 11, while the other or free end is connected to the stem 20 for operating the valve 21 to control the flow of fluid in the line 22.

The plunger 10 is biased against movement due to the fluid under pressure in the chamber 12 by the spring 23 connected at one end to the operating arm 18 and at the other end to the casting 11. Thus the spring 23 urges the plunger into the chamber 12 with a predetermined force which must be overcome by the pressure of the fluid to actuate the controls.

The plunger extension 16 is also provided with the head 24 arranged to strike the movable contact member 25 for closing a circuit through the contacts 26 between the terminals 27 and 28 which may be connected to an electric control or operating circuit. The source of electric current supply is represented by the battery 29. This electric switch may be normally retained in its open position by means of a spring or the coil magnet 30 energized by a circuit between the terminals 27 and 31 including the contacts 26 or another circuit between the terminals 31 and 32.

The mechanical and electrical controls illustrated merely demonstrate two characters of control. It is obvious that many types of controls may be substituted therefor.

The hydraulic packing 14 when compressed by the gland 15 produces a very high static friction coefficient on the plunger 10 and a material force is required to move the same, and the apparatus described thus far is inoperative as a sensitive pressure control. In order to make the plunger 10 respond to slight changes in pressure the high static friction coefficient must be eliminated. This is accomplished by continuously maintaining hydrostatic impulses on the plunger causing it to oscillate. As long as the plunger is kept moving the friction coefficient is nil and the plunger will readily respond to very small changes in pressure. The magnitude of the oscillations is preferably small and when retained between very short limits the plunger becomes extremely sensitive to slight changes in pressure. In effect the average curve of the oscillations represent the fluid pressure curve.

In Fig. 1 the hydrostatic pulsations in the chamber 12 are produced by the oscillator 33 which comprises the reciprocating piston 34 driven from any suitable source such as the rotary cam 35. The piston 34 generates hydrostatic pulsations in the chamber 36 which are transmitted to the chamber 12 through the line 37. A variable orifice valve 38 may be placed in the line 37 for modulating the amplitude of these hydrostatic pulsations.

The illustration shown in Fig. 1 presupposes that the source of fluid pressure acting on the plunger is not of pulsating character. If however this source of fluid under pressure is normally subjected to hydrostatic pulsations such as the character produced by a reciprocating pump, then it is not necessary to employ an oscillator similar to that disclosed in Fig. 1 as the pulsations produced by the pump will oscillate the plunger. Ordinarily the pulsations produced by a reciprocating pump may cause oscillations of excessive magnitude if directly imposed on the plunger and it is therefore necessary to provide a restricted orifice to choke or reduce the oscillations to any desired magnitude as placing the valve 38 in the line 13.

A similar fluid pressure control apparatus is shown in Fig. 2 which represents the actual structure employed in conjunction with the spray generating apparatus illustrated diagrammatically in Figs. 3 and 4 and disclosed in the co-pending application Serial Number 258,199, filed February 24, 1939, and is made a part of the present application for the purpose of this invention.

The spray generating apparatus illustrated in Figs. 3 and 4 comprises a liquid supply tank 72, a fuel supply tank 73, and a combustion chamber having a heating coil 74 arranged to be heated by a burner 75. The burner shown in Fig. 3 is of the vaporizing type and the burner shown in Fig. 4 is of the pressure atomizing type. The liquid is withdrawn from the tank 72 through the line 76 by the pump 77 and fed through the line 78 to one end of the heating coil 74. Fuel is withdrawn from the supply 73 through the line 79 by another section of the pump 77 and fed through the control device and the line 80 to the burner 75.

In spray generating apparatus of this character the fluid pressure for producing the spray is generated by converging a portion of the liquid into vapor or steam, which pressure discharges the liquid to the atmosphere. The amount of fluid pressure produced is determined by the amount of vapor or steam generated which in turn is controlled by the amount of heat supplied as correlated with the amount of liquid supplied to the heating coil 74. The proportions of liquid to the vapor or steam generated may be changed by varying the amount of either the liquid or the heat supplied per unit of time. Thus the greater the amount of heat the "drier" the spray and contra the "wetter" the spray within the limits of the range of the apparatus in the latent heat zone.

The spray fluid which is composed of the liquid and a vapor of the liquid is conveyed from the heating coil through the hose 81 to the gun nozzle 82 where it is discharged to the atmosphere. The fluid pressure produced by the vapor and steam within the latent heat zone forces the heated liquid through the nozzle 82 to the atmosphere. The sudden drop in pressure on the heated water as it passes from the nozzle causes it to flash, breaking up into fine globules forming a misty spray which has excellent cleaning properties.

A hand valve 83 is provided on the gun nozzle 82 for controlling the flow of the spray and for shutting it off entirely. When the valve 83 is closed the heat generated fluid pressure builds up, requiring a control for the apparatus that will prevent further generation of pressure and will regulate the fluid pressure during normal operation of the apparatus or when the flow of the spray is changed. The control device illustrated in Fig. 2 regulates the fluid pressure during normal operation by varying the heat supplied to the burner and will shut off the burner and by-pass the liquid if the fluid pressure reaches a predetermined amount. This control device starts the spray generating apparatus when the valve 83 is again opened because of the drop in pressure in the heating coil. The flow of liquid is again established through the coil and the fuel is then permitted to flow to the burner to generate the vapor and steam and build up the fluid pressure to produce the spray.

The control device is shown in detail in Fig. 2 wherein the control plunger 40 is arranged to reciprocate within the chamber 41 and is sealed by the hydraulic packing 42 compressed by the gland member 43. The chamber 41 is connected to the chamber 44 by means of the passageway 45 controlled by the valve 46 providing a variable orifice. The chamber 44 is connected through the opening 47 to the source of fluid pressure which in the spray generating apparatus is the line 78 carrying the spray liquid from the pump to the heating coil 74. The pump 77 in this instance is of the reciprocating type of the character disclosed in Patent No. 2,131,749 which produces pulsations in the liquid.

The plunger 40 is hollow and is arranged to receive the stem of the valve 48 which passes through the partition separating the chambers 41 and 44 and when seated closes the opening 49 which represents a by-pass line 84 for returning the liquid delivered by the pump of the spray generating apparatus to the reservoir 72 from which it is withdrawn. The valve 48 is biased to its closed position by the spring 50 between the plunger and the ring 51 on the valve stem.

The plunger 40 has a long stem 52 secured thereto which passes through the open space 53 between the assembled castings 39 and 39' which form the body of the control valve, and the plunger is sealed as it enters the liquid fuel chamber 54 by means of the packing 55 compressed by the gland 56. 57 represents an oil seal which prevents the fuel from coming in contact with the packing.

The gland member 56 is hollow for receiving one end of the spring 58, the other end of which bears against the plunger 40 to resist movement of the latter due to pressure in the chamber 41. The tension of this spring may be adjusted by means of the gland 56, the outer end of which is exposed in the opening 53.

The fuel for heating the liquid in the coils to generate a spray mixture is pumped from the source of fuel supply 73 through the opening 59 into the chamber 60. When the pressure of the fuel is sufficient to overcome the force of the spring 61, the hollow plunger 62 is moved to the left and the inturned flange 63 thereof engages the collar 64 on the stem of the valve 65 and carries the same along therewith, thus lifting the valve 65 from its seat and permitting the fuel to pass from the chamber 60 through the opening 66 to an atomizing burner 75 where it is ignited to heat the liquid. The pressure required to move the plunger 62 against the force of the spring 61 taking up the lost motion between the flange 63 and the collar 64 is that required for atomizing the fuel.

The valve 65 is retained on its seat by means of the spring 67. Thus when the fuel pressure is reduced the spring 61 forces the plunger 62 to the right but the spring 67 closes the valve 65 before the fuel pressure drops below that required for atomization. If the fuel is subjected to pulsations owing to the fact that it is supplied by a reciprocating pump the plunger 62 acts as an alleviator smoothing out the pulsations.

If on the other hand the pressure of the fuel exceeds a predetermined amount the ports 68 in the wall of the plunger are uncovered and permit the fuel to flow into the chamber 54 where it is returned through the opening 69 to the source of supply 73. This by-pass reduces the fuel pressure to a predetermined amount and the plunger acting in this respect may be regarded as a safety relief valve.

In like manner if the pressure of the liquid in the chamber 44, which is effective through the passageway 45 to the chamber 41, exceeds a predetermined pressure the inturned flange on the plunger 40 takes up the lost motion and engages the collar 51 to lift the valve 48 from its seat and by-pass the liquid from the pump to the opening 47, to the chamber 44 and out the opening 49 to the source of liquid supply 72. The plunger 40 is also a safety relief valve for spray liquid.

However under normal operation of the spray generating apparatus the liquid is supplied at a constant rate to the heating coil 74 and the fuel is varied by the pressure of the liquid to effect a substantially constant pressure on the liquid. Thus the pressure of the liquid builds up and moves the plunger 40 to the right. The end of the stem 52 engages the spring loaded ball check valve 70, unseating the same, and by-passes the fuel, permitting it to escape from the chamber 60 to the chamber 54 and thence to the fuel supply 73. This reduces the fuel pressure and thus the amount delivered to the heating zone. The reduction in fuel produces a reduction of pressure on the liquid in the heating zone with the result that the plunger 40 is moved to the left by the spring 58 and the by-pass valve 70 is again closed. The fuel pressure builds up again and the cycle is repeated.

The plunger 40 would not readily respond to changes in the pressure imposed on the liquid because of the static friction created by the hydraulic packing 42 unless it was oscillated. As explained above, the liquid pump is of the reciprocating type which provides the necessary oscillation of the plunger and the magnitude of these oscillations are regulated by the valve 46. The plunger is thus kept oscillating by the pulsations of the liquid and any change in pressure is effective in moving the plunger back and forward to properly regulate the fuel in accordance therewith.

When used in conjunction with a spray generating apparatus illustrated in Fig. 4 the valve 46 may be eliminated by connecting the chamber 41 through the opening 71 and the line 85 to the discharge end of the heating coil 74. The mixture of the liquid and vapor of a liquid or steam generated in the heating coil is not subjected to the pulsations created by the liquid pump. The vapor steam in the heating coils cushion these pulsations and when piped to the chamber 41 it has the same effect on the pulsating liquid in the passageway 45 and thereby dampens the oscillations of the plunger. Under these conditions the pressure in the chambers 41 and 44 is the same, yet the liquid in 44 is subjected to the pulsations and the mixture in 41 absorbs these pulsations, thereby producing the desired oscillations of the plunger. In actual practice the passageway 45 may be substituted by an annular clearance around the stem of the valve 48 and thus eliminate the expense of forming the passageway 45. However, the effect is the same.

If the pulsations are dampened out sufficiently to be ineffective in oscillating the plunger 40 by connecting the discharge of the heating coil through the line 85 to the opening 71, then the pressure changes of the mixture effective in the chamber 41 move the plunger 40 in jerks owing to the static friction of the packing 42. This jerk action sharply actuates the by-pass fuel valve 70 with a snap and thus avoids dribbling and smoking of the fuel when the burner is shut off and on by this pressure control. Thus the connection 71 is used with an atomizing type burner to prevent the fuel from dribbling into the combustion chamber at a pressure less than that required to produce atomization. The control apparatus used in this manner deviates from the broad concept of this invention which deals with the oscillation of a member subjected to static friction through which member very sensitive control is obtained but could not be obtained if the oscillations were not effective in overcoming the static friction imposed on the member.

I claim:

1. In a pressure control valve, the combination of a valve housing having two chambers, external connections to said chambers, a pressure biased plunger extending into one chamber, a packing sealing said plunger to prevent leakage from said pressure chamber, a valve stem supported in said plunger and arranged to close on a valve seat in the other chamber for closing a second connection therewith, and means defining a restricted passageway between said chambers.

2. In a pressure control valve, the combination of a valve housing having two chambers, external connections to said chambers, a pressure biased plunger extending into the first chamber, a packing sealing said plunger to prevent leakage from said pressure chamber, a valve stem extending from the first chamber into the second chamber and arranged to close an opening to the latter chamber, said plunger arranged to actuate said valve after it travels through a predetermined movement, a stem on said plunger extending into a third chamber and sealed therewith for actuating another valve.

3. In a control apparatus, the combination of a housing having two oppositely disposed chambers, the first chamber being divided into an inner and outer compartment, the inner compartment having a fluid connection thereto, the second chamber having a valve therein for controlling the passage of fluid therethrough, a pressure biased control plunger having one end operating in the inner compartment of the first chamber and the other end operating in the second chamber and arranged to actuate said valve, a packing in each chamber for sealing the plunger and which impresses a static friction thereon, a pressure biased valve carried by the plunger and arranged to extend into and seat in the outer compartment for controlling the flow of fluid therethrough, said valve being operated by the movement of the plunger, a pulsating fluid connected to the outer compartment, and means for connecting the outer compartment with the inner compartment of the first chamber making the pulsating liquid effective on the plunger for producing an oscillating movement of limited magnitude of the plunger and overcome the static friction created by the packing, thereby making the plunger sensitive to movement in response to changes in the pressure of the fluid in the inner compartment, said fluid pressure being effective to move the plunger and operate the valve in the second chamber and further movement operate the valve in the outer compartment of the first chamber.

4. In a control apparatus, the combination of a housing having two oppositely disposed chambers, the first chamber being divided into an inner and outer compartment, the inner compartment having a fluid connection thereto, the second chamber having a valve therein for controlling the passage of fluid therethrough, a pressure biased control plunger having one end operating in the inner compartment of the first chamber and the other end operating in the second chamber and arranged to actuate said valve, a packing in each chamber for sealing the plunger and which impresses a static friction thereon, a pressure biased valve carried by the plunger and arranged to extend into and seat in the outer compartment for controlling the flow of fluid therethrough, said valve being operated by the movement of the plunger, a pulsating fluid connected to the outer compartment, means for connecting the outer compartment with the inner compartment of the first chamber making the pulsating liquid effective on the plunger for producing an oscillating movement of limited magnitude of the plunger and overcome the static friction created by the packing, thereby making the plunger sensitive to movement in response to changes in the pressure of the fluid in the inner compartment, said fluid pressure being effective to move the plunger and operate the valve in the second chamber and further movement operate the valve in the outer compartment of the first chamber, and means for varying the effective magnitude of the plunger oscillations.

5. In apparatus for controlling the pressure of a pulsating fluid through the action of another fluid which is effective in changing the pressure of the pulsating fluid, the combination of two chambers, the first chamber being in communication with the pulsating fluid and the second chamber being in communication with the other fluid, a valve in the second chamber arranged to control the flow of fluid through said chamber, a pressure biased control plunger having one end operating in the first chamber and the other end operating in the second chamber and arranged to actuate said valve, a packing in each chamber for sealing the plunger and which impresses a static friction thereon, the pulsations of the fluid producing an oscillating movement of limited magnitude of the plunger to overcome the static friction of said packings, thereby making said plunger sensitive to movement in response to changes in the pressure of the pulsating fluid which changes in pressure move the plunger and operate the valve determining the flow of the fluid through the second chamber to control the pressure of the pulsating fluid.

6. A fluid pressure control device comprising a casing having a chamber with liquid therein and connected to a fluid under pressure, a plunger having one end extending into said chamber arranged to move in response to changes in the fluid pressure on the liquid in the chamber, a packing surrounding the plunger to seal said chamber, the inherent friction of said packing being of sufficient magnitude to prevent movement of the plunger when subjected to slight changes in said fluid pressure, and means for continuously imposing hydraulic pressure impulses on the liquid in the chamber in addition to and independent of said fluid pressure, said hydraulic pressure impulses being sufficient to overcome the inherent friction of the packing and permit the plunger to move in response to slight differences in said fluid pressure.

7. A fluid pressure control device comprising a casing having a chamber with liquid therein and connected to a fluid under pressure, a plunger having one end extending into said chamber arranged to move in response to changes in the fluid pressure on the liquid in the chamber, a packing surrounding the plunger to seal said chamber, the inherent friction of said packing being of sufficient magnitude to prevent movement of the plunger when subjected to slight changes in said fluid pressure, means for continuously imposing hydraulic pressure impulses on the liquid in the chamber in addition to and independent of said fluid pressure, said pressure impulses being sufficient to overcome the inherent friction of the packing and permit the plunger to move in response to slight differences in said fluid pressure, and means actuated by the plunger for controlling said fluid pressure.

8. A fluid pressure control device comprising a casing having a chamber with liquid therein and connected to a fluid under pressure, a plunger having one end extending into said chamber arranged to move in response to changes in the fluid pressure on the liquid in the chamber, a packing surrounding the plunger to seal said chamber, the inherent friction of said packing being of sufficient magnitude to prevent movement of the plunger when subjected to slight changes in said fluid pressure, means for continuously imposing hydraulic pressure impulses on the liquid in the chamber in addition to and independent of said fluid pressure, said hydraulic pressure impulses being sufficient to overcome the inherent friction of the packing and permit the plunger to move in response to slight differences in said fluid pressure, and means for controlling the effective magnitude of the liquid pulsations within said chamber.

9. A fluid pressure control device comprising a casing having a chamber with liquid therein and connected to a fluid under pressure, a pressure-biased control plunger having one end extending into said chamber and the other end arranged to actuate a control, said plunger being arranged to move in response to changes in the fluid pressure on the liquid in the chamber, a packing surrounding the plunger to seal said chamber, the inherent friction of said packing being of sufficient magnitude to prevent movement of the plunger when subjected to slight changes in said fluid pressure, and means for continuously imposing hydraulic pressure impulses on the liquid in the chamber in addition to and independent of said fluid pressure, said hydraulic pressure impulses being sufficient to overcome the inherent friction of the packing and permit the plunger to move in response to slight differences in said fluid pressure.

10. A fluid pressure control device comprising a casing having a chamber with liquid therein and connected to a fluid under pressure, a plunger having one end extending into said chamber arranged to move in response to changes in the fluid pressure on the liquid in the chamber, a packing surrounding the plunger to seal said chamber, the inherent friction of said packing being of sufficient magnitude to prevent movement of the plunger when subjected to slight changes in said fluid pressure, means for continuously imposing hydraulic pressure impulses on the liquid in the chamber in addition to and independent of said fluid pressure, said hydraulic pressure impulses being sufficient to overcome the inherent friction of the packing and permit the plunger to move in response to slight differences in said fluid pressure, and an electric contact means actuated by said plunger controlling an electric circuit.

11. A fluid pressure control device comprising a casing having a chamber with liquid therein and connected to a fluid under pressure, a plunger having one end extending into said chamber arranged to move in response to changes in the fluid pressure on the liquid in the chamber, a packing surrounding the plunger to seal said chamber, the inherent friction of said packing being of sufficient magnitude to prevent movement of the plunger when subjected to slight changes in said fluid pressure, means for continuously imposing hydraulic pressure impulses on the liquid in the chamber in addition to and independent of said fluid pressure, said hydraulic pressure impulses being sufficient to overcome the inherent friction of the packing and permit the plunger to move in response to slight differences in said fluid pressure, and valvular means actuated by said plunger for controlling the flow of liquid through said chamber.

FRANK W. OFELDT.